US005764967A

United States Patent [19]

Knaack

[11] Patent Number: 5,764,967
[45] Date of Patent: Jun. 9, 1998

[54] MULTIPLE FREQUENCY MEMORY ARRAY CLOCKING SCHEME FOR READING AND WRITING MULTIPLE WIDTH DIGITAL WORDS

[75] Inventor: Roland T. Knaack, Starkville, Miss.

[73] Assignee: Cypress Semiconductor Corporation, San Jose, Calif.

[21] Appl. No.: 620,812

[22] Filed: Mar. 29, 1996

[51] Int. Cl.[6] .................................................. G06F 1/04
[52] U.S. Cl. .......................... 395/555; 395/558; 395/559
[58] Field of Search .................................. 395/558, 559, 395/306, 307, 308, 309, 555; 365/220, 221, 189.01, 189.04

[56] References Cited

U.S. PATENT DOCUMENTS

| | | | |
|---|---|---|---|
| 4,467,443 | 8/1984 | Shima | 395/416 |
| 4,802,122 | 1/1989 | Auvinen et al. | 365/154 |
| 4,839,866 | 6/1989 | Ward et al. | 365/221 |
| 4,864,543 | 9/1989 | Ward et al. | 365/221 |
| 4,875,196 | 10/1989 | Spaderna et al. | 365/238 |
| 4,876,670 | 10/1989 | Nakabayashi et al. | 365/194 |
| 4,891,788 | 1/1990 | Kreifels | 365/49 |
| 4,985,867 | 1/1991 | Ishii et al. | 365/221 |
| 5,084,837 | 1/1992 | Matsumato et al. | 395/250 |
| 5,088,061 | 2/1992 | Golnabi et al. | 365/189.01 |
| 5,220,529 | 6/1993 | Kohiyama et al. | 365/189.01 |
| 5,222,047 | 6/1993 | Matsuda et al. | 365/230.03 |
| 5,228,002 | 7/1993 | Huang | 365/221 |
| 5,262,996 | 11/1993 | Shiue | 362/221 |
| 5,265,063 | 11/1993 | Kogure | 365/233 |
| 5,305,253 | 4/1994 | Ward | 365/73 |
| 5,311,475 | 5/1994 | Huang | 365/221 |
| 5,317,756 | 5/1994 | Komatsu et al. | 395/800 |
| 5,345,419 | 9/1994 | Fenstermaker et al. | 365/189.04 |
| 5,367,486 | 11/1994 | Mori et al. | 365/189.05 |
| 5,375,092 | 12/1994 | Taniguchi et al. | 365/221 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,412,611 | 5/1995 | Hattori et al. | 365/221 |
| 5,426,612 | 6/1995 | Ichige et al. | 365/220 |
| 5,467,319 | 11/1995 | Nusinov et al. | 365/231 |
| 5,471,632 | 11/1995 | Gavin et al. | 395/284 |
| 5,490,257 | 2/1996 | Hoberman et al. | 395/427 |
| 5,506,809 | 4/1996 | Csoppenszky et al. | 365/221 |
| 5,506,815 | 4/1996 | Hsieh et al. | 365/230.03 |
| 5,513,318 | 4/1996 | van de Goor et al. | 395/185.01 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |

FOREIGN PATENT DOCUMENTS

| | | |
|---|---|---|
| 0113996 | 8/1989 | Japan. |
| 0676559 | 6/1994 | Japan. |

OTHER PUBLICATIONS

U.S. Serial No. 08/567,893—Filed Dec. 6, 1995—Attorney Docket No. 64,663–013 For: State Machine Design For Generating Empty and Full Flags In an Asynchronous FIFO.

U.S. Serial No. N/A—Filed Mar. 25, 1996—Attorney Docket No. 64,663–037 For: A Clocking Scheme For Independently Reading and Writing Multiple Width Words From a Memory Array.

*Primary Examiner*—Dennis M. Butler
*Attorney, Agent, or Firm*—Bliss McGlynn, P.C.

[57] ABSTRACT

The present invention provides a clocking circuit for receiving a particular sized data word from a common input at a fixed frequency, writing the word to a number of individual memory cells in a storage device, reading another particular sized data word from the individual memory cells at a second particular frequency and presenting the data words to a common output at the second frequency. The storage device can be implemented as a memory array but is not limited to a memory array. The size of the words written to the storage device can be larger, smaller or the same as the size of the word read from the storage device. The present invention uses a multi-bit write counter to distribute a write timing signal at a particular frequency to a number of decoder and multiplexer blocks and a multi-bit read counter to distribute a read timing signal at a second particular frequency to a number of sense amplifier blocks.

24 Claims, 3 Drawing Sheets

MULTIPLE FREQUENCY MEMORY ARRAY CLOCKING SCHEME FOR READING AND WRITING MULTIPLE WIDTH DIGITAL WORDS

FIELD OF THE INVENTION

The present invention relates to memory buffers generally and, more particularly, to a clocking circuit for allowing devices operating at different frequencies to be interconnected.

BACKGROUND OF THE INVENTION

Memory buffers, such as FIFO buffers, may interconnect two independent devices that operate at different speeds. For example, a typical fax machine employs a FIFO buffer to write information as fast as it is received from a phone line connection. Next, the printer of the fax machine prints pages at a somewhat slower speed. The printer prints the pages from the data stored in the FIFO buffer.

More advanced circuits that use buffers to link two different speed devices include multiple network topology gateways. For example, a token-ring network can be connected to a 10-baseT Ethernet network through a gateway. The gateway converts information from the first network to the second network. The gateway typically employs some type of buffering (e.g., a FIFO buffer) to store information for a short period of time until the second network can receive the information. This type of buffering in a gateway is more pronounced when converting from a high transfer speed network, such as a 100-baseXT Ethernet network, to a lower transfer speed network, such as a 10-baseT Ethernet network. The 100-baseXT Ethernet network obviously operates at a much higher speed than the 10-baseT Ethernet network (e.g., 100-baseXT operates at 100 MBPS where 10-baseT operates at a 10 MBPS).

Different bandwidth networks can generate higher operating bandwidths by using two basic principles. The first principle is to increase the clock speed of the reference frequency used by the network protocol. The second principle is to increase the width of the data words sent across the network. A memory buffer that writes a particular size memory word to a memory array and reads a second particular size memory word from the memory array is described in copending application Ser. No. 08/621,487, (Attorney Reference No. 64.663-037) incorporated herein by reference in its entirety.

Shift register schemes have been implemented to create clocking. circuits for writing and reading from a memory array. However, these shift register based clocking circuits become less practical when the width of the data words used is 32-bits as compared to a 16-bit data bus. A 32-bit shift register is much more difficult to implement in such a clocking configuration than a 16-bit shift register. 32-bit word widths are becoming the industry standard with 64-bit word widths receiving limited attention at this time.

A typical backward compatibility issue arises when a new microprocessor is first introduced on the market. Typically, the new microprocessor may expand the width of the processor, but may be required to work with a smaller word width data bus. For example, when the 386 architecture was first introduced, it expanded the processor width to 32-bits, while the industry standard was 16-bits. To accommodate the transition time, as well as to make a more economical transition, the SX processor was introduced that allowed the new microprocessor to work with a reduced (i.e., 16-bit) data bus. A similar implementation has occurred with the introduction of the Pentium processor, which is a 64-bit microprocessor. Until the industry standard bus width is increased to 64-bits, the 64-bit processor must be able to work in an environment with a 32-bit data bus.

It is desirable to receive a particular sized data word from a data input, write the word to a storage device at a particular frequency, read a different size data word at a different frequency from the storage device and present the different size word to a data output. The prior schemes do not contemplate either multiple size word writing and reading, nor do they contemplate a frequency shift with or without a change in word size. In particular, the chip real estate problems encountered with implementing a 32-bit shift register may be magnified when implementing a system that both writes a particular sized digital word at a particular frequency to a storage device and reads out a different sized digital word at a different frequency from the storage device.

There may be some limitation in the maximum operating frequency with the larger shift register schemes. To implement a 32-bit or larger shift register, the area and routing necessary to hook up the individual signals when using a 16-bit portion may limit the maximum switching frequency of the shift register. It is desirable to remove this limitation. The increased routing when using the 32-bit portion may also limit maximum operating frequency.

SUMMARY OF THE INVENTION

The present invention provides a clocking circuit for receiving a particular sized data word from a common input at a fixed frequency, writing the word to a number of individual memory cells in a storage device, reading another particular sized data word from the individual memory cells at a second particular frequency and presenting the data words to a common output at the second frequency. The storage device can be implemented as a memory array but is not limited to a memory array. The size of the words written to the storage device can be larger, smaller or the same as the size of the words read from the storage device.

The present invention uses a multi-bit write counter to distribute a write timing signal at a particular frequency to a number of decoder and multiplexer blocks and a multi-bit read counter to distribute a read timing signal at a second particular frequency to a number of sense amplifier blocks. Each of the decoder and multiplexer blocks receives both a data input signal from the common input and the write timing signal when power is applied to the circuit. When a particular write timing signal is present at the decoder and multiplexer, the fixed width data input is presented to one or more of the memory cells of the storage device. Each of the sense amplifier blocks reads data from the storage device and receives a read timing signal when power is applied to the circuit. When a particular read timing signal is present at a sense amplifier, the output signal containing a fixed data word, at a second particular frequency, is read from one or more of the corresponding memory cells of the storage device and is presented to the common output.

The present invention reduces the number of internal signal lines necessary to implement the control function and allows for easy modification to both read and write multiple width words at different frequencies from the storage device.

The objects, features and advantages of the present invention include providing a control circuit for distributing data to a number of memory arrays from a common input at a fixed frequency, reading data from a number of memory arrays at a second fixed frequency and presenting the data to a common output at the second fixed frequency. The control circuit of the present invention works with both asynchronous and synchronous FIFOs as well as other memory devices. The circuit produces distributing and reading effect(s) at different frequencies using a minimum number of signal lines and eliminates the use of a number of wide bit shift registers. Thus, the present circuit consumes less overall chip real estate and can be very easily adapted to larger or smaller memory organization systems with minimum design changes. The present invention can be easily adapted to denser and wider memory devices with multiple data input and output word widths. The present invention can also operate at high frequencies due to the compact nature of the physical layout of the counters.

BRIEF DESCRIPTION OF THE DRAWINGS

These and other objects, features and advantages of the present invention will be apparent from the following detailed description and the appended drawings and claims in which:

DETAILED DESCRIPTION OF THE PREFERRED EMBODIMENTS

Figure 1:
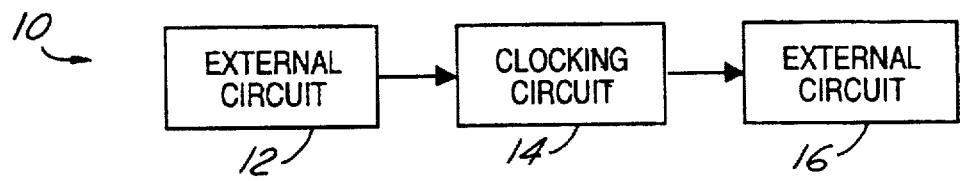
FIG. 1 is a block diagram of a clocking circuit according to a preferred embodiment of the present invention.

Referring to FIG. 1, a block diagram of a circuit 10 is shown in accordance with a preferred embodiment of the present invention. The circuit 10 generally comprises an external circuit 12, a clocking circuit 14 and an external circuit 16. The external circuit 12 can be operating at any particular frequency desired and the external circuit 16 can be operating at any other particular frequency desired. The frequency of the external circuit 12 can even be the same as the frequency as the external circuit 16. As a result, the clocking circuit 14 acts as a frequency converter from the frequency of the external circuit 12 to the frequency of the external circuit 16. If the frequency of the external circuit 12 is faster than the frequency of the external circuit 16, the clocking circuit 14 buffers the additional words until the external circuit 16 is capable of receiving them. This is particularly advantageous in a burst mode situation where a large amount of data is transferred in a short amount of time followed by little or no data transfer. During the burst of information, the clocking circuit 14 buffers words and then presents them to the external circuit 16 at a frequency that can be accommodated.

Figure 2:
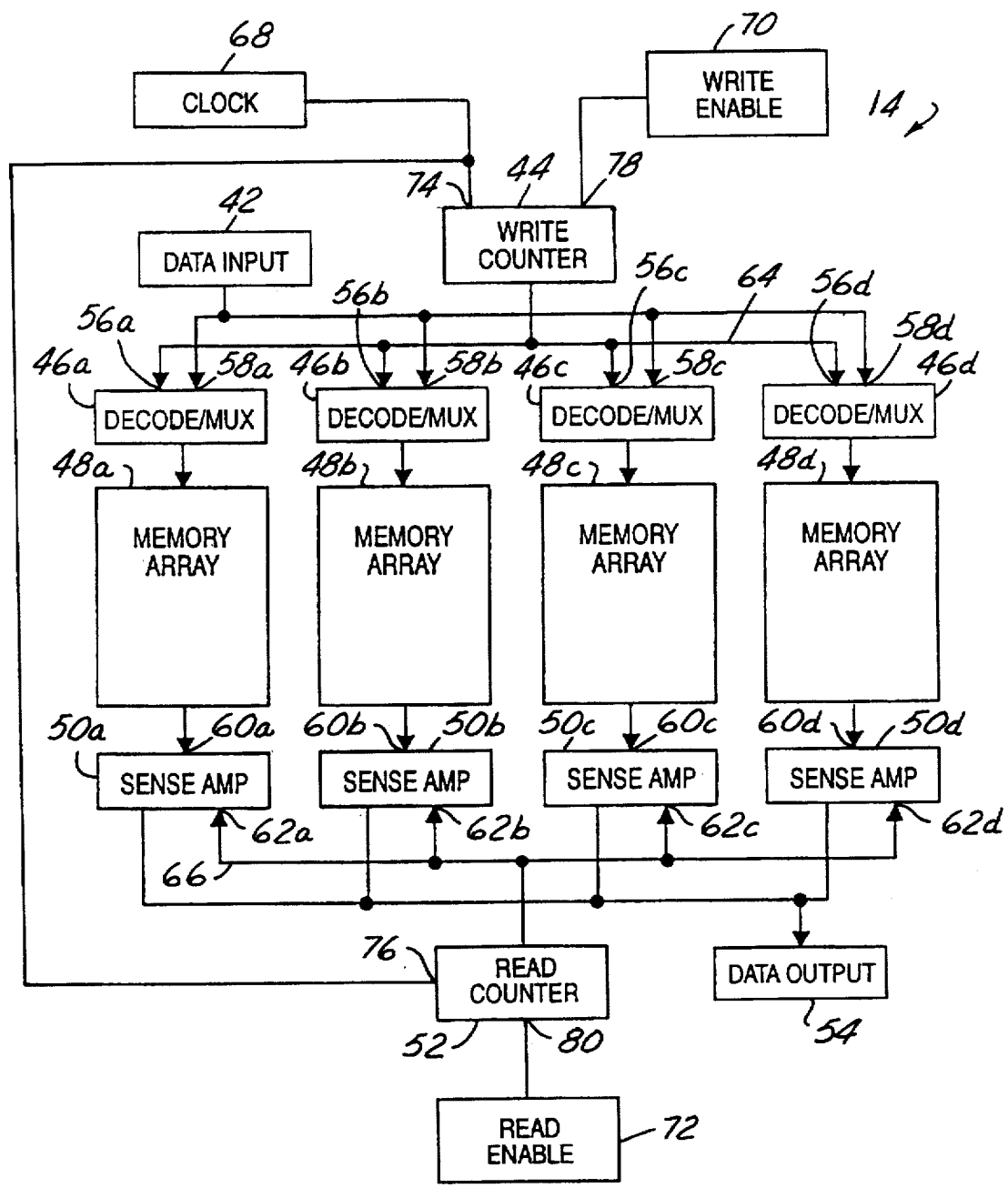
FIG. 2 is a more detailed block diagram of the clocking circuit of a preferred embodiment of the present invention.

Referring to FIG. 2, a block diagram of a clocking circuit 14 is shown in accordance with a preferred embodiment of the present invention. The clocking circuit 14 generally comprises a data input 42, a write counter 44, a set of decoder and multiplexers 46a, 46b, 46c and 46d, a set of memory arrays 48a, 48b, 48c and 48d, a set of sense amplifiers 50a, 50b, 50c and 50d, a read counter 52, and a data output 54. Each of the decoder and multiplexers 46a–46d have a write timing input 56a–56d and a signal input 58a–58d. The write timing inputs 56a–56d of each of the decoder and multiplexers 46a–46d receive a write timing signal from the write counter 44 when power is applied to the clocking circuit 14. The signal input 58a–58d of each of the decoder and multiplexers 46a–46d receive a digital word from the data input 42 when power is applied to the clocking circuit 14. One or more of the decoder and multiplexers 46a–46d writes a digital word to the corresponding memory array 48a–48d when a particular timing signal is received at the appropriate write timing input 56a–56d. The write timing input 56a–56d of each of the decoder and multiplexers 46a–46d is received through a timing bus 64. The decoder and multiplexers 46a–46d act as receiving devices which provide a means for receiving data and preferably sending the data to a memory device, such as a decoder, a decoder and multiplexer or other device(s) providing equivalent function(s).

Each of the sense amplifiers 50a–50d has a signal input 60a–60d and a read timing input 62a–62d. Each of the sense amplifiers 50a–50d is capable of receiving a digital word from the corresponding memory array 48a–48d when power is applied to the timing circuit 14. Each of the read timing inputs 62a–62d of the sense amplifiers 50a–50d receive a read timing signal from the read counter 52 when power is applied to the timing circuit 14. One or more of the sense amplifiers 50a–50d presents a signal to the data output 54 when an appropriate read timing signal is received at one of the read timing inputs 62a–62d. The read timing input 62 of each of the sense amplifiers 50a–50d is received from the read counter 52 through a timing bus 66. The sense amplifiers 50a–50d can also be implemented as a latch or other output device that has a similar operation. Specifically, the sense amplifiers 50a–50d can be any output device that receives data from memory arrays 48a–48d by sensing a potential present, and possibly, but not necessary, amplifying the potential.

The detailed workings of the word conversion of the clocking circuit 14 are described in copending application Ser. No. 08/621,487, (Attorney Reference No. 64,663-037). Additional components to produce the frequency conversion include a clock 68, a write enable 70 and a read enable 72. The clock 68 can be an externally supplied clock. The clock 68 presents a reference clock to an input 74 of the write counter 44 as well as to an input 76 of the read counter 52. The write enable 70 is presented to an enable input 78 of the write counter 44. The read enable 72 is presented to an enable input 80 of the read counter 52.

The write enable 70 and the read enable 72 provide additional wait states necessary to compensate for the word width conversion performed by the clocking circuit 14. For example, if the data input 42 presents a stream of 9-bit digital words to the memory arrays 48a–48d and the data output receives a series of 18-bit digital words from the memory arrays 48a–48d, the write enable 70 and the read enable 72 must provide a 2-to-1 compensation. Specifically, the write enable 70 must be enabled on two clock cycles for every one clock cycle that the read enable 72 is enabled. Both the write enable 70 and the read enable 72 can be user supplied inputs. The write enable 70 and the read enable 72 also can be, but are not limited to, internally generated signals. If the frequency of the read enable 72 is one-half the frequency of the write enable 70, the 2-to-1 ratio of compensation is provided. Essentially, the read enable 72 is adding one additional wait state per read cycle of the clocking circuit 14. The ratio of the compensation provided by the write enable 70 and the read enable 72 is further illustrated by the following TABLE 1:

TABLE 1

| SIZE OF WORDS WRITTEN | SIZE OF WORDS READ | FREQUENCY COMPENSATION READ ENABLE/WRITE ENABLE |
| --- | --- | --- |
| 9-BIT | 18-BIT | .5 |
| 9-BIT | 36-BIT | .25 |
| 18-BIT | 9-BIT | 2 |
| 36-BIT | 9-BIT | 4 |

Figure 3:
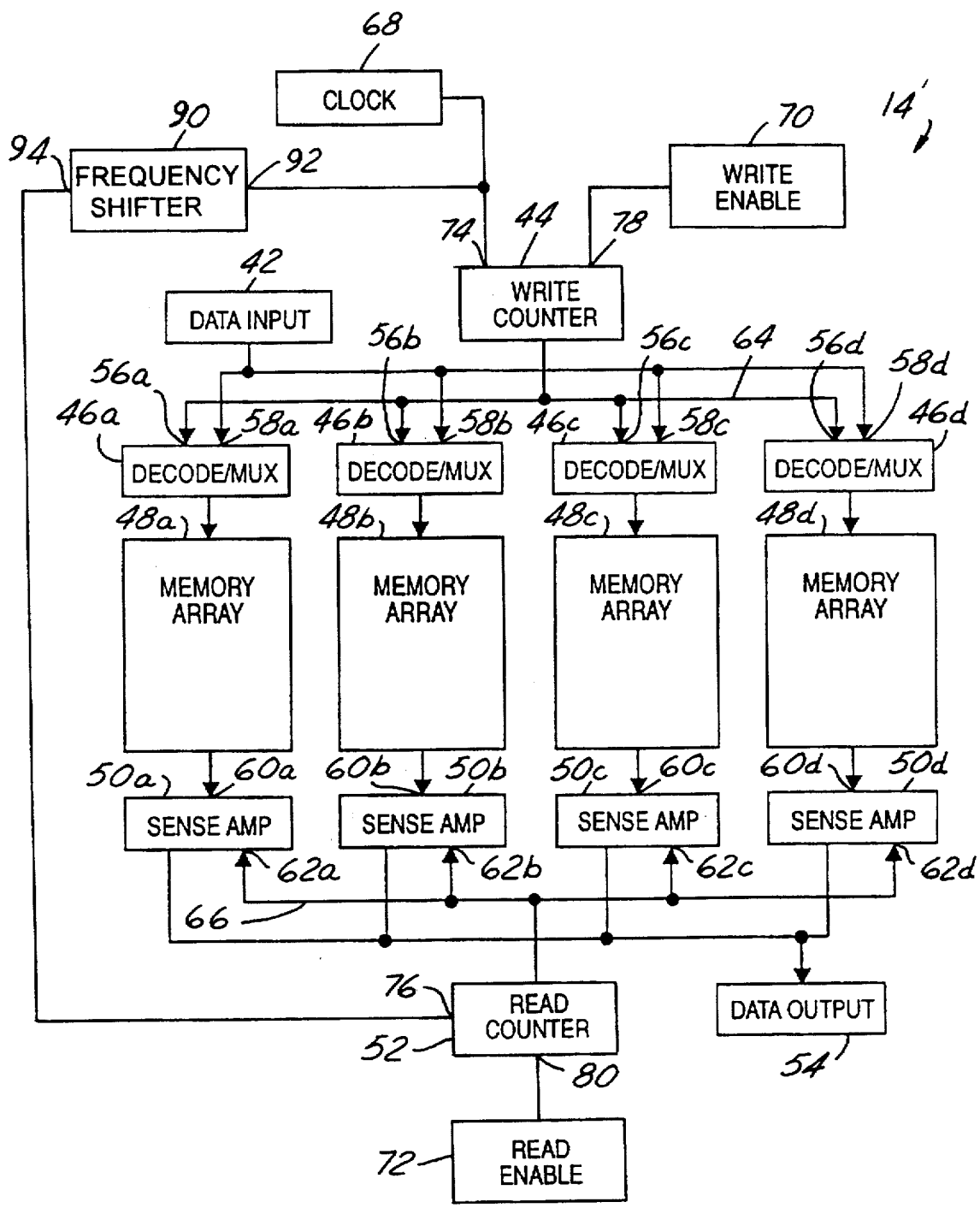
FIG. 3 is a detailed block diagram of an alternative embodiment of the present invention.

Referring to FIG. 3, an alternate embodiment clocking circuit 14' according to the present invention is shown. FIG. 3 further comprises a frequency shifter 90. The frequency shifter 90 has an input that is received from the clock 68 and an output 94 that presents a manipulated clock signal to the input 76 of the read counter 52. In the alternate embodiment clocking circuit 14', the write enable 70 and the read enable 72 are normally in an active state. Specifically, the write enable 70 and the read enable 72 are not variable frequency enable signals as shown in the FIG. 2 embodiment, but rather are either enabled or not enabled in a steady state condition. The frequency shifter 90 provides the compensation for the multiple width digital words as illustrated in the TABLE 1. Specifically, if 9-bit digital words are presented at the data input 42 and 18-bit digital words are received at the data output 54, the frequency shifter 90 divides the clock 68 by two and presents this reduced frequency clock at the input 76 of the read counter 52. The number of clocks required to produce the various frequencies can be reduced. Specifically, the clock 68 may drive both the write counter 44 and the read counter 52. As a tradeoff, the write enable 70 and the read enable 72 may be connected to an additional logic to prevent overrunning and underrunning of the memory arrays 48a–48d. Such additional logic is described in co-pending application Ser. No. 08/567,893, incorporated herein by reference in its entirety.

Figure 4:
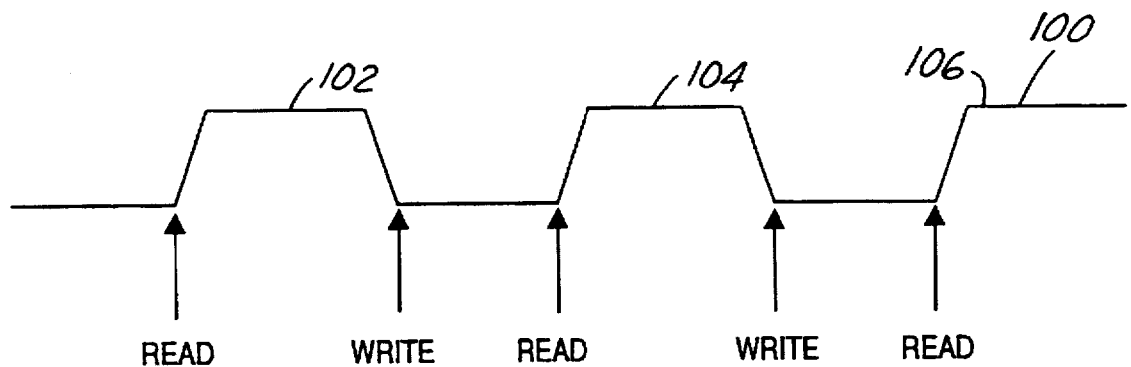
FIG. 4 is a timing circuit illustrating the reading and writing of the memory array.

Referring to FIG. 4, a timing clock 100 is shown. The timing clock 100 has a pulse 102, a pulse 104 and a pulse 106. On the leading edge of the pulse 102, 104 and 106 a digital word is read from the memory arrays 48a–48d. On the falling edge of the pulse 102, 104 and 106, a digital word is written to the memory arrays 48a–48d. As a result, the clocking circuit 14 can be used for both synchronous and asynchronous applications. The clock input may have a read/write pin so that when the function is enabled the clocking circuit 14 can write asynchronously. The read/write pin is one example of operating the clocking circuit 14 in both synchronous and asynchronous applications.

Figure 5:
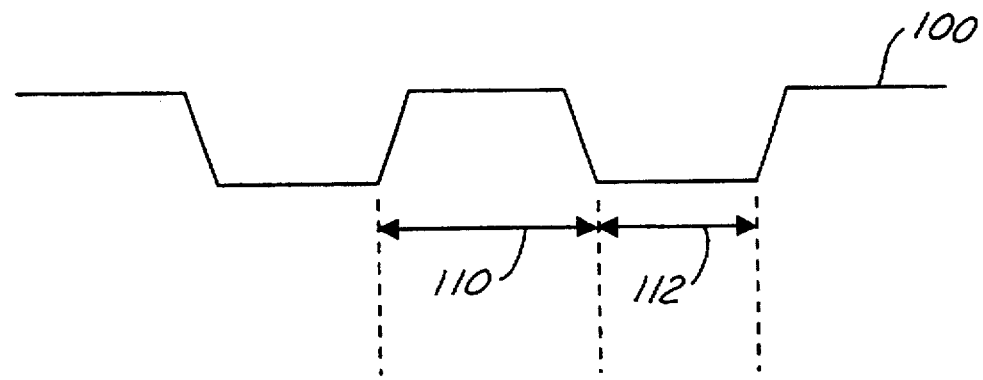
FIG. 5 is a timing diagram illustrating the writes and reads of the decoder/multiplexers and the sense amplifiers on the half cycles of the input clock.

Referring to FIG. 5, a timing clock 100 is shown illustrating the write/read function of the clocking circuit 14 as well as the counter incrementing function of the clocking circuit 14. Since the write counter 44 and the read counter 52 are not in the speed path of the writing or reading of the memory arrays 48a–48d, the counters can be incremented on the opposite pulse of the clock cycle as the read or write operations are executed. For example, a positive pulse 110 illustrates when the write and read functions are implemented, while a negative pulse 112 illustrates when the counters are incremented. This allows one half of each clock cycle to decode the write timing signal at the decoder and multiplexers 46–46d. Similarly, one half of each clock cycle may decode the read timing signal at the sense amplifiers 50a–50d. Since the output of the write counter 44 is presented to the decoder and multiplexers 46a–46d and the output of the read counter 52 is presented to the sense amplifiers 50a–50d, the half cycle decoding is efficiently implemented. This half cycle decoding is a particular advantage when implementing circuits that run very fast (e.g., greater than 100 MHz).

The present invention may be implemented as a data interface between systems which exchange data of the same or different bit sizes at the same or different rate. Such systems may include, but are not limited to, a network gateway, a modem, a facsimile machine, a disk drive buffer, a peripheral-computer interface, etc.

While the invention has been particularly shown and described with reference to the preferred embodiments thereof, it will be understood by those skilled in the art that various changes in form and details may be made without departing from the spirit and scope of the invention.

I claim:

1. A circuit for reading and writing data to a number of memories comprising:

a plurality of receiving devices each receiving (i) one or more fixed width digital words and (ii) a write timing signal, at least one of said plurality of receiving devices presenting an output in an order defined by said write timing signal;

a first counter circuit for receiving (i) a timing clock and (ii) a write enable control signal, said first counter circuit configured to provide said write timing signal changing to a different unique value on each common cycle of said timing clock and said write enable control signal;

a plurality of memory devices for storing information, wherein each of said memory devices is configured to (i) receive an input from said plurality of receiving devices in an order defined by said write timing signal and (ii) present an output in an order defined by a read timing signal;

a plurality of output devices each receiving (i) said memory device outputs and (ii) a read timing signal, at least one of said output devices forms a multiple-width word by presenting one of said output(s) of said output devices when a read timing signal is present; and a second counter circuit for receiving (i) said timing clock and (ii) a read enable control signal, said second counter circuit configured to provide said read timing signal changing to a different unique value on each common cycle of said timing clock and said read enable control signal.

2. The circuit according to claim 1 wherein said common cycle of said timing clock and said write enable control signal create a write input frequency.

3. The circuit according to claim 1 wherein said common cycle of said timing clock and said read enable control signal create a read output frequency.

4. The circuit according to claim 2 wherein said write input frequency is greater than or equal to a word ratio defined as said fixed width of said input to said receiving devices divided by a width of said multiple width digital word.

5. The circuit according to claim 3 wherein said read output frequency is less than or equal to a word ratio defined as said fixed width of said input to said receiving devices divided by a width of said multiple width digital word.

6. The circuit according to claim 1 wherein said write enable control signal comprises a clock signal having a fixed frequency.

7. The circuit according to claim 1 wherein said read enable control signal comprises a clock signal having a first fixed frequency.

8. The circuit according to claim 7 wherein said write enable control signal comprises a clock signal having a second fixed frequency.

9. The circuit according to claim 7 wherein said write enable control signal receives said timing clock at a first clock input and said read enable control signal receives said timing clock at a second clock input.

10. The circuit according to claim 9 wherein said second clock input shifts the frequency of said timing clock as compared to said first clock input.

11. The circuit according to claim 9 wherein said second clock input shifts the frequency of said timing clock as a multiple of said first clock input.

12. The circuit according to claim 11 wherein said multiple is defined as an inverse of a word ratio defined as said fixed width of said input to said receiving devices divided by a width of said multiple width digital word.

13. The circuit according to claim 1 wherein said write enable control signal comprises a digital signal being at either a first digital state or at a second digital state.

14. The circuit according to claim 1 wherein said read enable control signal comprises a digital signal being at either a first digital state or at a second digital state.

15. The circuit according to claim 1 wherein said write enable control signal and said read enable control signal are internally generated signals.

16. The circuit according to claim 1 wherein said write enable control signal and said read enable control signal are externally generated signals.

17. The circuit according to claim 1 wherein said width of said input to said receiving devices and a width of said multiple width digital word are independently programmable.

18. The circuit according to claim 1 wherein said memory devices are asynchronous devices each having a read/write enable pin.

19. The circuit according to claim 1 wherein said write timing signal and said read timing signal change on a first half of each cycle of said timing clock.

20. The circuit according to claim 19 wherein said memory devices receive said inputs and said output devices present said data output on a second half of each cycle of said timing clock.

21. A network gateway comprising the circuit of claim 1.

22. A fax machine buffer comprising the circuit of claim 1.

23. A method of transferring data comprising:

(a) inputting a signal comprising (i) one or more fixed width digital words and (ii) a write timing signal which changes to a different unique value on each cycle of a first clock, to a plurality of receiving devices for receiving said signal in an order defined by said write timing signal;

(b) when said write timing signal is present, sending data from said receiving devices to a plurality of memory devices;

(c) sending data from said storage devices to a plurality of output devices;

(d) inputting a read timing signal which changes to a different unique value on each cycle of a second clock, to said plurality of output devices, said second clock being the same as or different from said first clock; and (e) when said read timing signal is present, outputting data from said plurality of storage devices in an order defined by said read timing signal.

24. The method of claim 23, wherein said plurality of storage devices each further comprise a circuit configured to detect a change in electric potential.

\* \* \* \* \*